E. F. W. ALEXANDERSON.
ELECTRIC BRAKING.
APPLICATION FILED OCT. 9, 1909.
974,224.
Patented Nov. 1, 1910.
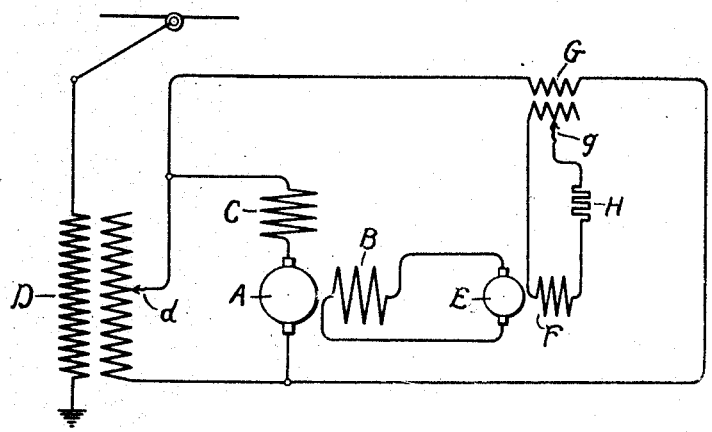
WITNESSES:
J. Earl Ryan
J. Ellis Glen.
INVENTOR:
ERNST F. W. ALEXANDERSON
BY Albert G. Davis
HIS ATTORNEY

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC BRAKING.

974,224.   Specification of Letters Patent.   Patented Nov. 1, 1910.

Application filed October 9, 1909. Serial No. 521,924.

*To all whom it may concern:*

Be it known that I, ERNST F. W. ALEXANDERSON, a citizen of the United States, residing at Schenectady, in the county of Schenectady, State of New York, have invented certain new and useful Improvements in Electric Braking, of which the following is a specification.

My invention relates to the operation of alternating current commutator motors as generators to return energy to the source for dynamic braking, and its object is to simplify and to increase the efficiency of the control.

It has been proposed heretofore to operate an alternating current commutator motor as a braking generator by exciting its field with current approximately in phase with that of the source and connecting the armature to the source. The exciting current may be derived from the armature of an exciter, the field of which is supplied from the source. Since the field winding of the exciter is highly inductive, its field current is substantially 90° out of phase with the voltage of the source, and the armature voltage of the exciter being in phase with the field current is also 90° out of phase with the voltage at the source. This exciter voltage impressed on the highly inductive field winding of the motor produces a current lagging behind it by approximately 90°, and, therefore, approximately in phase with the voltage of the source. The exciter may be a machine expressly provided for the purpose, driven either at a constant speed or varying in speed with the motor, or one of the motors of a car equipment may be employed as the exciter for the other motors. The connections between the motor armature and the source are conveniently controlled by means of a transformer inserted in the connections, the ratio of which may be varied to vary the braking effect.

In practice certain difficulties have been found in the operation of such a braking system as I have outlined above. When a motor is running at full speed and its field is excited with current of the proper phase, its armature has a certain voltage depending upon the strength of the field current and the speed of the motor. It is then necessary, if the motor is to be connected to the source without an undue rush of current, that the connections from the motor should be made to the proper taps on the transformer between the motor and the source. If the motor is connected to taps having too high or too low a voltage a rush of current will occur between the source and the motor, which may cause a shock on the motor and may cause burning of the commutator. Even if the speed of the motor were always constant, each excitation of the motor field would require a certain connection between the motor and the source, and in practice the motor speed is always constantly varying so as to complicate the control.

My invention consists in a novel method of control, whereby the operation is much simplified. I provide means for varying simultaneously the connections between the source and the motor, and the strength of current in the motor field for varying the braking torque, and varying independently the strength of the motor field current to adjust the motor armature voltage for different speeds. For any given speed, since the motor connections to the source and the motor field excitation are controlled and varied simultaneously, the excitation is always of the right amount for each connection of the motor to the source, or, vice versa, each connection of the motor to the source is necessarily correct for the existing field strength of the motor. Since the motor speed varies, it is necessary to provide independent means for adjusting the motor voltage for different speeds. This adjustment once made, the motor may be connected to any tap of the transformer without producing a rush of current, the only effect produced in shifting from one tap to another being a variation in the braking torque.

My invention will be best understood by reference to the accompanying drawing, which shows diagrammatically an alternating current commutator motor arranged to be controlled in accordance with my invention.

In the drawing, A represents the armature of an alternating current commutator motor; B the field or exciting winding, and C the usual compensating winding.

D represents a transformer through which the motor may be connected to the source of current.

Since my invention is particularly applicable to braking motors or vehicles, I have indicated the transformer primary as connected to a supply conductor through a trolley.

E represents the armature and F the field winding of an exciter. This exciter may be a machine provided especially for the purpose, driven either at constant speed or at a speed varying with that of the motor, or it may be one of the other driving motors on the vehicle.

G represents a transformer supplying the exciter field F.

H represents a phase controlling device, such as a resistance in the circuit of the exciter field winding.

The primary of transformer G is connected in shunt to the motor armature and compensating winding, so that the voltage impressed on the transformer primary is always the same as that on the motor armature circuit. A contact $d$ is connected to one terminal of the motor armature circuit, and by engagement with different points on the secondary of transformer D varies the ratio of transformation of this transformer. A contact $g$ is arranged to vary the number of turns of the secondary of transformer G in circuit with the field winding F, and thereby to adjust the voltage impressed on this field winding. This contact $g$ is for the purpose of adjusting the excitation for different speeds, while the contact $d$ is for the purpose of controlling the braking torque.

Assuming for a moment that the motor is running at a given speed and the contact $g$ properly adjusted for that speed, it will be seen that any movement of contact $d$ varies the voltage on the motor armature and on the exciter field simultaneously, so that if the transformer G is properly proportioned to give the correct excitation at that certain speed with the contact $d$ in one position, correct excitation will be given with the contact $d$ moved to any other position. Consequently, the motor excitation having been adjusted for the proper speed, the contact $d$ may be placed so as to impress a low voltage both on the motor armature and on the primary of transformer G, and then the contact may be moved so as to increase this voltage and thereby to increase the braking torque, the motor excitation remaining at the proper value for all positions of the contact as long as the motor speed remains constant.

The adjustment of the motor excitation for different speeds is accomplished, as has been said, by the contact $g$. A tachometer may be placed in view of the motorman, so as to give him information at all times for properly adjusting the contact $g$.

The contact $g$ is first adjusted in its proper position for the speed at which the motor happens to be running before the motor armature circuit is closed by contact $d$. This latter contact is then adjusted to give the desired torque, and if the motor speed is reduced contact $g$ may be shifted to maintain the correct excitation while maintaining constant torque, the contact $d$ remaining fixed, or the torque may be varied by moving this contact.

In order to simplify the drawing, I have omitted the running connections of the motor and shown my invention applied to one motor only. It will be understood that my invention is applicable to any number of motors, and that any suitable running connections may be employed.

I do not wish to be understood as limiting myself to the particular arrangement shown and described, but aim in the appended claims to cover all modifications which come within the scope of my invention.

What I claim as new and desire to secure by Letters Patent of the United States, is—

1. The method of operating an alternating current commutator motor as a generator returning energy to the source for dynamic braking, which consists in connecting the motor armature to the source, separately exciting the motor field with current approximately in phase with the voltage of the source, varying simultaneously the connections between the motor armature and the source and the strength of the current supplied to the motor field to vary the braking torque, and varying the strength of said current independently to adjust the motor voltage for different speeds.

2. The method of operating an alternating current commutator motor as a generator returning energy to the source for dynamic braking, which consists in connecting the motor armature to the source through a transformer, separately exciting the motor field with current approximately in phase with the voltage of the source, varying simultaneously the ratio of transformation of said transformer and the strength of the current supplied to the motor field to vary the braking torque, and varying the strength of said current independently to adjust the motor voltage for different speeds.

3. The method of operating an alternating current commutator motor and an exciter therefor to cause the motor to act as a generator returning energy to the source for dynamic braking, which consists in connecting the exciter armature to the motor field and the motor armature and exciter field to the source, varying simultaneously the connections from the source to motor armature and exciter field to adjust the braking torque, and varying independently the voltage impressed on the motor field by the exciter armature to adjust the motor armature voltage for different speeds.

4. The method of operating an alternating current commutator motor and an exciter therefor to cause the motor to act as a generator returning energy to the source for dynamic braking, which consists in connecting the exciter armature to the motor field and the motor armature and exciter field to the source through a transformer, varying the ratio of transformation of said transformer and thereby affecting proportionally the motor armature and exciter field to vary the braking torque, and varying independently the voltage impressed from the source on the exciter field to adjust the motor armature voltage for different speeds.

5. In combination with an alternating current commutator motor and a source of current therefor, means for supplying to the motor field a current approximately in phase with the voltage of the source, means for connecting the motor armature to the source and for varying simultaneously the connections between the motor armature and the source and the strength of current supplied to the motor field, and independent means for varying independently the strength of said current.

6. In combination with an alternating current commutator motor and a source of current therefor, a transformer, means for supplying to the motor field a current approximately in phase with the voltage of the source, means for connecting the motor to the source through said transformer and for varying simultaneously the ratio of transformation of said transformer and the strength of the current supplied to the motor field, and independent means for varying independently the strength of said current.

7. In combination with an alternating current commutator motor and a source of current therefor, a transformer, an exciter for the field of said motor, means for connecting the exciter field and the motor armature to the source through said transformer and for varying the ratio of transformation of said transformer so as to affect the motor armature and exciter field simultaneously, and independent means for varying the voltage impressed by said exciter on the motor field.

8. In combination with an alternating current commutator motor and a source of current therefor, a transformer, an exciter for the field of said motor, means for connecting the exciter field and the motor armature to the source through said transformer and for varying the ratio of transformation of said transformer so as to affect the motor armature and exciter field simultaneously, and independent means for varying the voltage impressed from said source on the exciter field.

In witness whereof, I have hereunto set my hand this 8th day of October, 1909.

ERNST F. W. ALEXANDERSON.

Witnesses:
 BENJAMIN B. HULL,
 HELEN ORFORD.